United States Patent
Beriger et al.

[11] 3,897,521
[45] July 29, 1975

[54] S,S-DIALKYL-O-ALKYLTHIOALKYL PHOSPHITES AND PHOSPHATES

[75] Inventors: Ernst Beriger, Neuallschwil; Henry Martin, Basel, both of Switzerland

[73] Assignee: Ciba-Geigy AG, Basel, Switzerland

[22] Filed: June 27, 1973

[21] Appl. No.: 374,219

Related U.S. Application Data

[62] Division of Ser. No. 105,125, Jan. 8, 1971, Pat. No. 3,760,042.

[30] Foreign Application Priority Data

Jan. 16, 1970 Switzerland.............................. 595/70

[52] U.S. Cl. .......................... 260/948; 71/71; 71/87; 260/950; 260/951; 260/956; 260/963; 260/967
[51] Int. Cl.............................. C07f 9/16; A01n 9/36
[58] Field of Search ...................................... 260/948

[56] References Cited
UNITED STATES PATENTS
3,078,295   2/1963   Schrader........................ 260/948 X
FOREIGN PATENTS OR APPLICATIONS
948,530   2/1964   United Kingdom................. 260/948
969,029   9/1964   United Kingdom................. 260/948

*Primary Examiner*—Anton H. Sutto
*Attorney, Agent, or Firm*—Frederick H. Rabin

[57] ABSTRACT

Phosphoric acid esters of the formula

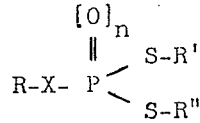

wherein X denotes oxygen or sulphur, the integer $n$ is the number 0 or 1, R' and R'' independently of each other represent an alkyl radical with 3 to 5 carbon atoms and wherein a. if X is oxygen, R represents an alkoxyalkylene, alkylmercaptoalkylene or alkenyloxyalkylene radical with at most 7 carbon atoms, and alkenyl radical with 3 to 6 carbon atoms or an unsubstituted benzyl group or a benzyl group which is substituted by halogen, methyl and/or methoxy, or wherein b. if X is sulphur, R represents an alkenyl radical with 3 to 6 carbon atoms or an unsubstituted benzyl group or a benzyl group substituted by halogen, methyl and/or methoxy; these compounds are useful for defoliating and promoting the ripening of crop plants especially cotton.

5 Claims, No Drawings

S,S-DIALKYL-O-ALKYLTHIOALKYL PHOSPHITES AND PHOSPHATES

This is a division of application Ser. No. 105,125, filed on Jan. 8, 1971, now U.S. Pat. No. 3,760,042.

The present invention relates to a special group of phosphites and phosphates that possess an activity for influencing the growth of plants, preferably a defoliating influence.

The invention further relates to the manufacture of these compounds and their use, as also to compositions that contain these compounds as active substances.

The new compounds correspond to the formula

(I)

wherein X denotes oxygen or sulphur, the integer n is the number 0 or 1, R' and R'' independently of each other represent an alkyl radical with 3 to 5 carbon atoms, and wherein a. if X is oxygen,
R represents a branched or unbranched alkoxyalklene, alkylmercaptoalkylene or alkenyloxyalkylene radical with at most 7 carbon atoms, an alkenyl radical with 3 to 6 carbon atoms or an unsubstituted benzyl group or a benzyl group which is optionally substituted by halogen, methyl and/or methoxy, or wherein b. if X is sulphur,
R represents an alkenyl radical with 3 to 6 carbon atoms or an unsubstituted benzyl group or a benzyl group which is optionally substituted by halogen, methyl or methoxy.

Among the phosphites and phosphates of formula I are certain groups possessing a particularly lasting biological activity, for example the compounds of the formula

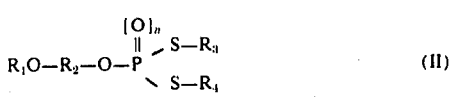
(II)

wherein $R_1$ represents an alkyl group with 1 to 3 carbon atoms, an alkenyl group with 3 to 6 carbon atoms, $R_2$ represents an alkylene group with 2 to 4 carbon atoms, $R_3$ and $R_4$ independently of each other represent an alkyl radical with 3 to 5 carbon atoms and the integer n is the number 0 or 1; furthermore, the compounds of the formula

(III)

wherein $R_5$ represents an alkenyl radical with 3 to 6 carbon atoms or an unsubstituted benzyl group or a benzyl group which is optionally substituted by halogen methyl or methoxy and $R_3$ and $R_4$ independently of each other represent an alkyl group with 3 to 5 carbon atoms, and X denotes oxygen or sulphur; also, the compounds of the formula

(IV)

wherein $R_6$ represents an alkyl group with 1 to 3 carbon atoms, $R_7$ represents an alkylene group with 2 to 4 carbon atoms, $R_3$ and $R_4$ independently of each other represent an alkyl radical with 3 to 5 carbon atoms and the integer n is the number 0 or 1; in addition, the compounds of the formula

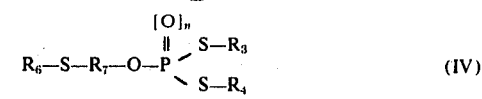
(V)

wherein X denotes oxygen or sulphur and $R_8$ represents an unsubstituted benzyl group or a benzyl group which is optionally substituted by halogen methyl or methoxy or wherein X denotes oxygen, $R_8$ is an alkenyl group with 3 to 6 carbon atoms, and $R_3$ and $R_4$ independently of each other represent an alkyl radical with 3 to 5 carbon atoms.

In the formulae I to V, the substituents R', R'', $R_3$ and $R_4$ preferably denote the n-propyl or n-butyl radical.

In the formulae, I, III and V, the term halogen denotes chlorine, bromine and iodine.

In U.S. Pat. No. 2,955,803, mono-, di- and thrithiophosphites which are substituted by hydrogen, lower alkyl and/or aryl, have already been described as defoliants for crop plants. The commercially available tri-(n-butyl)-trithiophosphite is well known, the activity of which is not satisfactory in practical application.

Furthermore, mono-, di- and trithiophosphates, preferably those with lower alkyl radicals, are described in U.S. Pat. No. 2,965,467 as defoliants, of which tri-(n-butyl)-trithiophosphate has become known as a commercial product. It also possesses deficient activity, especially in the defoliation of cotton plants.

With neither of the two commercial products is a satisfactory defoliation achieved or the growth of new leaves permanently suppressed. The activity is not improved by increased dosage.

Compared with these preparations, the group of compounds characterized by formula I exhibits considerable advantages, as the biological Examples detailed later on show.

In the case of plants that shed their leaves annually, abscission can be induced at any time desired by using compounds of formula I by themselves, or appropriately in the form of agents. If plants, especially crop plants such as cotton, soybean, fruit-bearing trees, or ornamental plants are treated in this way, abscission occurs as a rule within 3 to 6 days. In general, ripening is thereby promoted simultaneously.

Favorable rates of application for active substances of formula I are in the order of 1 to 6 kg per hectare. It must, however, be taken into consideration here that degree of ripening, stage of development, climate, weather, nature of the soil and other influences, will suggest, if necessary, rather higher or lower rates of application.

The compositions according to the invention containing preferably 1–80 percent by weight of active substance can be applied in diverse ways, for example in the form of dusts, aqueous dispersions, aqueous emulsions, granules and so forth. They also contain as a rule one or more solid or liquid carriers or extenders. By extenders are to be understood solid or liquid diluents.

The compounds of formula I can be applied to the plants in inert media, for example as a dust, mixed with a pulverulent, mineral carrier (for example mica, talc, pyrophyllite, clay) or they can be sprayed in aqueous form.

The agents are preferably also used mixed with small amounts of an anionic, cationic or non-ionic surfactant. Such an additive assists the dispersions of the compounds of formula I in water. The compounds can also be mixed with pulverulent carriers, such as mineral silicates, together with a small amount of a surface-active dispersing agent, in such a way that an easily wettable powder is obtained that can be applied directly to the plants or can be shaken with water in order to manufacture quickly a suspension of the chemical compound and of the pulverulent carrier in water.

The anionic surface-active substances which can be used with the present compounds or agents which influence plant growth correspond to the general formula R—COOM or R—$SO_3$M. Herein M represents an alkali metal, an ammonium radical or a substituted ammonium or amine radical and R represents an organic radical which contains at least one group with more than 8 carbon atoms. Examples of such anionic, surface-active agents are:

1. Soaps, for example sodium laurate, ammonium stearate and diethanolamine oleate.
2. Alkaline sulphonates, for example sodium dodecylsulphonate and potassium cetylsulphonate.
3. Alkyl-sulphates, for example sodium docecylsulphate and sodium oleyl-sulphate.
4. Sulphonated ethers with long and short chains of aliphatic groups, for example $C_{17}H_{33}$—O—$C_2H_4$—$SO_3$—Na.
5. Sulphated ethers with long and short chains of aliphatic groups, for example $C_{17}H_{33}$—O—$C_2H_4$—O—$SO_3$Na.
6. Sulphonated alkyl esters with long chains of fatty acids, for example

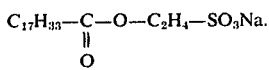

7. Sulphonated glycol-esters with long chains of fatty acids, for example

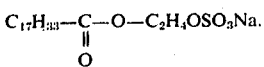

8. Sulphonated alkyl-substituted amides of fatty acids with a long chain

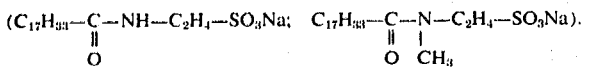

9. Alkylated arylsulphonates, for example sodium isopropylnaphthalenesulphonate and dodecylbenzenesulphonate.
10. Hydroaromatic sulphonates, for example sodium tetrahydronaphthalenesulphonate.
11. Alkylsulphosuccinates, for example sodium dioctylsulphosuccinate.
12. Arylsulphonate-formaldehyde condensation products, for example the condensation product of formaldehyde and sodium naphthalenesulphonate:

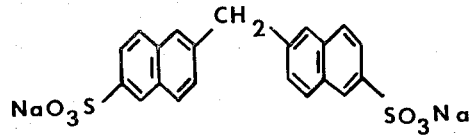

Non-ionic surface-active components which can be used for the present plant-influencing agents are, for example, the following:

1. Polyether-alcohols, such as for example the reaction products of ethylene oxide or polyethylene glycol with a fatty alcohol having a long chain, for example the reaction product of ethylene oxide and oleyl alcohol, $C_{17}H_{33}$—$(OC_2H_4)_n$—OH, wherein $n$ is 10 to 20.
2. Polyglycol-esters, for example the reaction products of ethylene oxide or polyethylene glycol with a fatty acid having a long chain, for example the reaction product of ethylene oxide or polyethylene glycol with oleic acid,

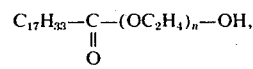

wherein $n$ is 10 to 20.

3. Partial esters of polyhydric alcohols with fatty acids having a long chain, for example diethylene glycol monolaurate and sorbitane trioleate.

Cationic surface-active compounds which can be used for the plant-influencing active substances according to the invention are, for example, the following:

1. Quaternary ammonium salts, in which one of the groups bonded to the nitrogen is an aliphatic group with at least 8 carbon atoms, for example trimethylcetylammonium iodide, laurylpyridinium chloride, cetyldimethylbenzylammonium chloride and N-stearylbetaine.
2. Amines, amides, diamines and glyoxalidines which possess an aliphatic group which contains at least 8 carbon atoms, and their acid esters, for example stearylamine hydrochloride, oleyamide, diethylethyleneoleyldiamine and Ω-heptadecyl-N-hydroxyethylglyoxalidine.

Furthermore, additional known defoliants, abscission accelerators or also growth regulators can be added to the active compounds of formula I in the practical application. Possible defoliants are, for example, tri-(n-butyl)-trithiophosphite (Folex), tri-(n-butyl)-trithiophosphate (DEF), or Na-cis-3-chloroacrylate (PREP). Known growth promoting substances that can be added to the compounds according to the invention are: ALANAP, DURASET, PHOSPHON, VERNOLEPIN, 6-furfurylaminopurine, naphthylacetic acid, β-indolybutyric acid, indolylacetic acid, fluorene-6-carboxylic acid and derivatives thereof, chlorocholine chloride, hydroxyethylhydrazine, cycloheximide, ascorbic acid, succinic acid-dimethylhydrazide, maleic acid hydrazide, 2,3,5-triiodobenzoic acid.

Together with the compounds of formula I, a satisfactory abscission accelerator is especially disodium-3,6-endoxohexahydropthalate, which has become known under the name Endothall.

The new phosphites and phosphates of formula (I)

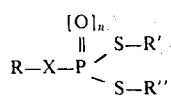
$$R-X-P\overset{[O]_n}{\underset{S-R''}{\underset{\|}{\diagdown}}}S-R' \qquad (I)$$

can be manufactured according to methods known per se by the stepwise replacement of the Cl atoms in $PCl_3$ and $POCl_3$ by corresponding alcohols or thioalcohols; for example, by reacting a dichloride of the formula

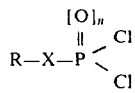
$$R-X-P\overset{[O]_n}{\underset{Cl}{\underset{\|}{\diagdown}}}Cl \qquad (VI)$$

stepwise with a mercaptan of the formula $$R' - SH$$

and with a mercaptan of the formula $$R'' - SH$$

preferably in the presence of a tertiary amine, in the process of which the reaction with the first mercaptan, in case R' and R'' are different, is carried out appropriately in the absence of a tertiary amine, or by reacting a mono-chloride of the formula

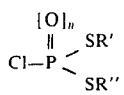
$$Cl-P\overset{[O]_n}{\underset{SR''}{\underset{\|}{\diagdown}}}SR' \qquad (VII)$$

with an alcohol or mercaptan of the formula $$R - XH$$

in the presence of a tertiary amine.

The generally kept substituents R, R', R'', X and n have the meaning given in formula I.

As tertiary amines there may be considered, for example, such usual representatives as triethylamine, triethylendiamine, ethyldiisopropylamine, N,N-dimethylaniline, pryidine, quinoline and others.

In the following Examples, the parts are parts by weight.

EXAMPLE 1

17.7 Parts of methoxyethyldichlorophosphite are introduced into 100 parts by volume of benzene. Thereto is added dropwise at 10°–20°C under nitrogen a mixture of 18.2 parts of butylmercaptan and 20 parts of triethylamine in 50 parts by volume of benzene. The mixture is stirred for 2 hours at ambient temperature. For processing, the benzene solution is shaken repeatedly with water and the solvent thereafter evaporated in vacuo. 23.9 Parts of a colourless oil of the formula $$CH_3OC_2H_4O-P(SC_4H_9n)_2 \quad n_D^{27} \ 1.5061 \text{ (Active substance No. 1)}$$

are obtained as residue.

The following derivatives were manufactured analogously:

| Active Substance No. | Formula | | |
|---|---|---|---|
| 2 | $CH_3OC_2H_4OP(SC_3H_7n)_2$ | $n_D^{27}$ | 1.5143 |
| 3 | $CH_3OC_2H_4OP(SC_4H_9sec)_2$ | $n_D^{27}$ | 1.5022 |
| 4 | $CH_3OC_2H_4OP(SC_4H_9tert.)_2$ | $n_D^{27}$ | 1.5029 |
| 5 | $CH_3OC_2H_4OP(SC_4H_9iso)_2$ | $n_D^{20}$ | 1.5091 |
| 6 | $CH_3OCH_2-\underset{\underset{CH_3}{\|}}{CH}-OP(SC_4H_9n)_2$ | $n_D^{23}$ | 1.5065 |
| 7 | $H_5C_2O(CH_2)_3OP(SC_4H_9n)_2$ | $n_D^{23}$ | 1.5039 |
| 8 | $nC_4H_9OCH_2CH_2OP(SC_4H_9n)_2$ | $n_D^{24}$ | 1.4769 |
| 9 | $CH_2=CHCH_2OCH_2CH_2OP(SC_4H_9n)_2$ | $n_D^{24}$ | 1.5141 |
| 10 | $H_5C_2SCH_2CH_2OP(SC_4H_9n)_2$ | $n_D^{21}$ | 1.5253 |
| 11 | 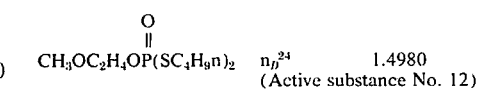 Cl—⟨⟩—$CH_2-S-P(SC_4H_9n)_2$ | $n_D^{22}$ | 1.5732 |

EXAMPLE 2

19.3 Parts of methoxyethyldichlorophosphite are introduced into 100 parts by volume of benzene. Thereto is added dropwise at 10°–20°C a mixture of 18 parts of butylmercaptan and 20.5 parts of triethylamine in 50 parts by volume of benzene. The mixture is stirred overnight at ambient temperature. For processing, water is added, the benzene solution is shaken repeatedly with water and the solvent thereafter evapaorated in vacuo. 24.3 Parts of a yellowish oil of formula $$CH_3OC_2H_4\overset{O}{\overset{\|}{P}}(SC_4H_9n)_2 \quad n_D^{24} \quad 1.4980$$
(Active substance No. 12)

are obtained as residue.

The following phosphoric acid esters were manufactured analogously:

| Active Substance No. | Formula | | |
|---|---|---|---|
| 13 | $CH_3OC_2H_4O\overset{O}{\overset{\|}{P}}(SC_4H_9sec)_2$ | $n_D^{24}$ | 1.4989 |
| 14 | $CH_3OCH_2CH_2O\overset{O}{\overset{\|}{P}}(SC_4H_9iso)_2$ | $n_D^{20}$ | 1.4971 |
| 15 | $CH_3OCH_2-\underset{\underset{CH_3}{\|}}{CH}-O\overset{O}{\overset{\|}{P}}(SC_4H_9n)_2$ | $n_D^{24}$ | 1.4952 |
| 16 | $H_5C_2O(CH_2)_3O\overset{O}{\overset{\|}{P}}(SC_4H_9n)_2$ | $n_D^{24}$ | 1.4921 |
| 17 | $CH_2=CH-CH_2OCH_2CH_2O\overset{O}{\overset{\|}{P}}(SC_4H_9n)_2$ | $n_D^{24}$ | 1.5010 |
| 18 | $H_5C_2SCH_2CH_2O\overset{O}{\overset{\|}{P}}(SC_4H_9n)_2$ | $n_D^{21}$ | 1.5223 |
| 19 | $CH_3OCH_2CH_2O\overset{O}{\overset{\|}{P}}(SC_3H_7n)_2$ | $n_D^{24}$ | 1.5033 |

EXAMPLE 3

26 Parts of dibutyldithiochlorophosphate (b.p. 131°C at 0.05 mm Hg) are introduced into 100 parts by volume of benzene. A mixture of 5.8 parts of allylalcohol and 10.5 parts of triethylamine in 20 parts of volume of benzene are added dropwise at 20°–30°C and the mixture stirred overnight at ambient temperature. For processing, the benzene solution is shaken repeatedly with water and the solvent thereafter evaporated in vacuo. 25.2 Parts of a light yellow oil of formula $$(nC_4H_9S)_2\overset{O}{\underset{\|}{P}}-OCH_2CH=CH_2 \quad n_D^{24} \quad 1.5304$$
(Active substance No. 20)

are obtained as residue.

The following esters can be manufactured in analogous manner:

| Active Substance No. | Formula | | |
|---|---|---|---|
| 21 | $(nC_4H_9S)_2\overset{O}{\underset{\|}{P}}-OCH_2-\langle\text{phenyl}\rangle$ | $n_D^{24}$ | 1.5392 |
| 22 | $(nC_4H_9S)_2\overset{O}{\underset{\|}{P}}-SCH_2-\langle\text{phenyl}\rangle$ | $n_D^{24}$ | 1.5569 |
| 23 | $(nC_4H_9S)_2\overset{O}{\underset{\|}{P}}-SCH_2-\langle\text{phenyl}\rangle-Cl$ | $n_D^{22}$ | 1.5661 |

EXAMPLE 4

Dusting Agents

Equal parts of an active substance according to the invention and precipitated silicic acid are finely ground. By mixing with kaolin or talic, dusting agents containing for preference 1–6% content of active substance are manufactured.

Spraying Powders

To manufacture a spraying powder, the following components, for example, are mixed and finely ground:
75 parts of active substance
10 parts of highly adsorptive silicic acid
10 parts of bolus alba (kaolin)
3.5 parts of a reaction product from p-tert.octylphenol and ethylene oxide
1.5 parts of sodium-1-benzyl-2-stearyl-benzimidazolyl-6,3'-disulphonate.

Emulsion Concentrate

Active substances that are readily soluble can also be formulated according to the following prescription:
20 parts of active substance
70 parts of xylene
10 parts of a mixture from a reaction product of an alkylphenol with ethylene oxide calcium dodecylbenzenesulphonate
are mixed. On diluting with water to the desired concentration there results an emulsion that is capable of being sprayed.

EXAMPLE 5

Four months old cotton plants (with their capsules burst open) that have been raised in conditioning cabinets, were sprayed with concentrations of the various preparations containing 4 kg of active substance per hectare. Six days later, evaluation took place according to a grading system of 1 to 5, in which 1 denotes no defoliation and 5 denotes total defoliation.

The results are listed in the following table:

| Active Substance No. | Defoliation |
|---|---|
| 1 | 5 |
| 10 | 5 |
| 11 | 5 |
| 12 | 5 |
| 15 | 5 |
| 18 | 4½ |
| 19 | 4½ |
| 20 | 5 |
| 21 | 5 |
| 22 | 5 |
| 23 | 5 |
| DEF | 4 |

EXAMPLE 6

Four months old cotton plants of the variety "Delta Pine" (approx. 1.20 m high) with 80–90% ripened, opened capsules, were treated in lots of 10.8 m² in South Africa in April during hot, dry weather, with active substance concentrations of 2 kg a.s./ha and 4 kg a.s./ha. The amount of water used was 820 liters per hectare. Tri-(N-butyl)-trithiophosphate (=Folex) was used as comparative substance. Three parallel tests were carried out per active substance and concentration. The leaves of all test plants were counted before the treatment and 1 and 2 weeks after the treatment.

Results

| Comp.No. | kg AS/ha | % Defoliation after 1 week | % Defoliation after 2 weeks | New Growth (No. of leaves per plant) |
|---|---|---|---|---|
| 20 | 2 | 76.2 | 85.4 | 13.9 |
|    | 4 | 86.4 | 95.0 | 7.6 |
| 21 | 2 | 78.7 | 89.4 | 4.5 |
|    | 4 | 92.4 | 94.5 | 24.3 |
| 22 | 2 | 76.8 | 88.4 | 16.8 |
|    | 4 | 90.0 | 92.6 | 18.8 |
| Folex | 2 | 73.6 | 83.6 | 17.6 |
|       | 4 | 84.3 | 84.9 | — |

— = not tested

Remarks:

The commercial preparation Folex (tri-(n-butyl)-trithiophosphite), even if applied at excess dosage, is not able to exceed a threshold value of approx. 85% defoliation. In contrast thereto, preparations according to the invention clearly show, at both concentrations, a better and permanent defoliation.

We claim:
1. A compound of the formula

$$R-O-\overset{[O]_n}{\underset{\|}{P}}-(S-nC_4H_9)_2$$

in which R is alkylthioalkylene wherein the alkylthio moiety has from 1 to 3 carbon atoms and the alkylene moiety has from 2 to 4 carbon atoms, and $n$ is the number 0 or 1.

2. A compound according to claim 1 in which $n$ is 0.
3. The compound according to claim 2 which is $$C_2H_5-S-C_2H_4-O-P-(S-nC_4H_9)_2$$

4. A compound according to claim 1 in which $n$ is 1.
5. The compound according to claim 4 which is $$C_2H_5-S-C_2H_4-O-\overset{O}{\underset{\|}{P}}-(S-nC_4H_9)_2.$$

* * * * *